United States Patent Office 3,650,959
Patented Mar. 21, 1972

3,650,959
ETCHANT FOR CUPREOUS METALS
Charles R. Shipley, Jr., Newton, and Oleh B. Dutkewych, Medfield, Mass., assignors to Shipley Company, Inc., Newton, Mass.
No Drawing. Filed July 24, 1970, Ser. No. 58,160
Int. Cl. C09k 3/00; C23f 1/00
U.S. Cl. 252—79.1
22 Claims

ABSTRACT OF THE DISCLOSURE

This invention is for a solution capable of continuous etching of cupreous metals without a requirement for substantial regeneration or replenishment, which etching solution comprises a source of cupric ions, at least one non-fuming complexing agent for cupric ions which is capable of forming a solution soluble copper (II) complex at solution pH, preferably a source of bromide or chloride ions and a source of nitrate ions. In a preferred embodiment, the etching solution also contains a solution soluble molybdenum, tungsten or vanadium compound. The invention is an improvement over prior art ammoniacal etchants inasmuch as it is capable of use over a wide range of pH, does not yield excessive ammonia fumes which would require expensive exhaust equipment and with frequent removal of copper precipitate as it forms, is capable of continuous use without frequent regeneration or substantial replenishment.

BACKGROUND OF THE INVENTION

(1) Introduction

This invention relates to etching solutions and more particularly, to etching solutions for cupreous metals capable of continuous re-use comprising cupric ions as a primary oxidant and a non-fuming complexing agent for said cupric ions.

(2) Description of the prior art

The stripping of copper coatings from substrates is a commonly encountered industrial operation. Typical copper stripping methods involve the use of acidic ferric chloride, cupric chloride, or chromic acid solutions. These methods, though effective, are often impractical in areas where waste disposal is regulated by law as such solutions are frequently required to be treated at considerable expense before the exhausted solutions can be discarded.

Ferric chloride solutions typically comprise from about 28° to 42° Baumé ferric chloride and free acid due to hydrolysis of the ferric chloride in aqueous solution which results in relatively low pH, typically below 2.0. Cupric chloride etching solutions typically are 1 to 3 molar in cupric chloride and contain HCl, NaCl, or $NH_4Cl$ as an additive. As with ferric chloride solutions, pH is typically maintained below about 2.0.

Problems are encountered with most commercially available etchants. The above described ferric chloride and cupric chloride etchants attack solder plate. All present disposal problems as they are highly corrosive and further, the metals in solution, particularly copper, will upset the role of bacteria required for sewage breakdown, as well as destroy plants and fish when dumped into natural waters. In addition, recovery of dissolved or precipitated metals is not economical even though the recovered metal values represent a potential asset.

Alkaline etchants useful above pH 8.5 and usually above pH 9.0 are also known. One such alkaline etchant for dissolving or stripping cupreous metal is disclosed in U.S. Pat. No. 3,231,503 and comprises a chlorite such as sodium chlorite as an oxidant in an alkaline solution containing an ammonium salt as a complexing agent for the metal stripped. The stripping solution is used at a pH of from 8 to 13 and preferably above pH 9. It is also disclosed in said patent that the useful life of the stripping solution can be extended upon exhaustion of the primary oxidant i.e., the chlorite by increasing the temperature to utilize dissolved copper in the cupric state as a secondary oxidant for further dissolution of copper converting the cupric copper to the cuprous form in the process. Consequently, at this stage of the etching operation, the etchant solution comprises an ammoniacal chloride solution of cupric ions as the sole oxidant having a pH between about 9 and 13. The chloride ions are provided by decomposition of the chlorite ions.

It has been found that the use of ammoniacal etchant solutions such as those described in the aforesaid Pat. No. 3,231,503 create problems as the high pH required causes excessive fuming of ammonia which fumes are a health hazard to an operator and create a requirement for expensive exhaust equipment. Moreover, because ammonia is evolved from the system, replenishment with ammonium hydroxide is required if the solution is to be used for an extended period of time.

In commonly-assigned copending U.S. patent application Ser. No. 58,170, there is disclosed an improved cupric etchant solution comprising a source of cupric ions, a non-fuming complexing agent for the cupric ions capable of forming a solution soluble copper (II) complex at solution pH and preferably, a source of bromide or chloride ions. A non-fuming complexing agent for cupric ions is defined in said application as one that will not liberate appreciable ammonia fumes during etching.

The etching solution of said application is an improvement over the cupric etching solution of U.S. Pat. No. 3,231,503 due to the substantial elimination of ammonia fumes during the etching operation, thus resulting in the elimination of a need for expensive exhaust equipment. Another significant advantage of said application is the virtual elimination of the need for constant replenishment with an ammonium hydroxide to replace that which is lost by fuming, especially at lower pH below about 7.5. There is the further advantage that pH need not be maintained above 8.0 to obtain effective etching, but is capable of being selected within the relatively broad operating pH range of from about 4.0 to 13.0, dependent upon the selection of the complexing agent and its solubility characteristics at any given pH. Finally, the etching solutions of said application are basic formulations potentially capable of continuous use without substantial regeneration or replenishment provided that certain precautions are taken as described in said application.

In commonly-assigned U.S. patent application Ser. No. 58,200 filed concurrently herewith, there is disclosed an improved cupric etchant solution comprising a source of cupric ions, a complexing agent for said cupric ions which is capable of forming a solution soluble (II) complex at solution pH, preferably a source of bromide or chloride ions and a solution soluble molybdenum, tungsten or vanadium compound. The improvement is in the addition of the solution soluble molybdenum, tungsten or vanadium compound which is added to the etchant to prevent or substantially retard the attack of the etching solution on tin and lead-tin plate, thereby substantially enlarging the field of utility for such etchants.

STATEMENT OF THE INVENTION

The invention is a further improvement in etchants of the above described type comprising a source of cupric ions, a non-fuming chelating agent capable of forming a solution soluble copper (II) chelate at solution pH, and preferably, the source of chloride or bromide ions. The improvement is the addition of nitrate ions to the etchant solution which addition expands the capability of such etchants for continuous use without replenishment or regeneration.

The above described etchants are basically capable of continuous re-use provided that copper precipitate is removed continuously or periodically during the etching operation. It has been observed that during continuous etching, a film forms on the surface of a copper part being etched which film retards the rate of etching until, in some cases, etching stops. In accordance with this invention, the film, believed to be a film of cuprous sludge, is eliminated by the addition of a minor amount of nitrate ion to the etching solution.

DESCRIPTION OF THE PREFERRED EMBODIMENTS

Etching takes place in accordance with the following two reactions:

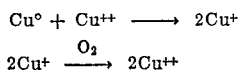

As presented above, one mole of divalent copper oxidizes one mole of metallic copper to two moles of monovalent copper which latter is then oxidized to divalent copper by aeration such as by bubbling air through the solution, spray etching or the like. Sufficient divalent copper oxidant is maintained constant in solution to satisfactorily etch copper by the solubilizing effect of the complexing agent with excess copper precipitating in the form of an oxide or hydroxide. Thus, the etchant does not become saturated with copper residues. With removal of the copper precipitate periodically or continuously as it forms, the etchant can be used continuously provided certain precautions are taken, as will be discussed in greater detail below. Chloride or bromide ion in solution is believed to act as a catalyst or exaltant for the etching reaction.

Substantially any cupric salt may be used as a source of the cupric ion. Typical cupric salts include, by way of example, cupric sulfate, cupric chloride, cupric nitrate, cupric acetate, and the like. The amount of cupric ion in the etchant solution is not critical, may vary within broad limits and to some extent is dependent upon the quantity of complexing agent used. A preferred range comprises from about 0.1 to 1.2 moles initially per liter of solution and most preferably, from 0.2 to 0.6 mole per liter. Higher concentrations tend to increase etching rate.

The complexing agent in accordance with the invention serves an important function. It is believed to solubilize sufficient cupric to permit etching. In this respect, it should be noted that within the operable pH range of from 4 to 13, insufficient cupric ion is held in solution to provide a satisfactory etching rate. Increasing the concentration beyond the normal solubility limit by the addition of a complexing agent permits addition of enough cupric ion to provide a satisfactory etch rate which is defined for purposes of this invention as at least 0.1 mil copper per minute with solution agitation.

The selection of the complexing agent is not critical provided certain guidelines are followed. For example, the complexing agent must be non-fuming, that is, it will not liberate appreciable ammonia fumes during the etching operation. Consequently, ammonium hydroxide is not within the scope of the invention for its complexing capability though ammonium ions may be added in minor amount as a exaltant as will be described in greater detail below. Another requirement of the complexing agent is that it be capable of forming a solution soluble copper (II) complex at some range within the desired pH range of from 4 to 13, within which range the etchant should be used. Further, the copper (II) complex should dissociate in the solution to an extent that permits etching of copper at at least the minimum rate of 0.1 mil per hour. In this respect, it should be readily apparent that the extent of dissociation of a complex is dependent upon numerous facts such as solution pH, solution temperature, concentrations of various additives and the like. Thus, though a particular copper (II) complex may not dissociate to a sufficient extent under one set of operating conditions, it may dissociate sufficiently under a different set of operating conditions to provide a satisfactory etching rate. As a guideline only, the log of the stability constant ($K_1$) for a particular copper (II) complex should not exceed 18 and preferably should not exceed 12 at 25° C. Stability constants for a great number of copper (II) complexes are set forth in Martell, Stability Constants of Metal-Ion Complexes, Special Publication No. 17, Section II, The Chemical Society, London, 1964, incorporated herein by reference.

Typical complexing agents for purposes of the present invention include hydroxy-carboxylic acids, especially aliphatic hydroxy-carboxylic acids such as hydroxyacetic acid (glycollic acid), maleic acid, tartaric acid, gluconic acid, lactic acid, and the like; polyalcohols such as glycerol, sorbitol, diethylene glycol and mannitol; keto-acids such as pyruvic acid and levulinic acid; polyamines, especially aliphatic polyamines such as trimethylamine, tetrahydroxypropylethylene diamine, pentahydroxypropyldiethylene triamine and propylenediamine; heteroaliphatic dicarboxylic acids such as diglycollic acid; amino acids, especially aliphatic amino acid such as aminoacetic acid, alpha-aminopropionic acid, beta-aminopropionic acid, alpha-aminobutyric acid, iminodiacetic acid, iminotriacetic acid and ethylenediaminotetraacetic acid; alkanolamines such as monoethanolamine, diethanolamine, monoisopropanolamine and diisopropanolamine; and pyrophosphates such as sodium and potassium pyrophosphate. Of the above, certain of the alkanolamines are most preferred as they provide the fastest etching rates and the alkylene amines are least preferred, as they provide the slowest etching rates. In this respect, it should be noted that the log of the stability constant for typical alkylene amines is substantially higher than for typical alkanolamines, thus substantiating to some extent, the theory set forth above regarding dissociation of the copper (II) complex.

Though lesser amounts of complexing agents may be used in solution, the amount preferably used is that sufficient to complex all of the cupric ion initially in solution and more particularly, the complexing agent is present in an amount of at least 1.5 times the amount necessary to complex all of the cupric ion originally in solution and most preferably, at least 5 times the necessary amount to provide etching capacity. As should be apparent to those skilled in the art, the concentration of complexing agent used is dependent upon the type of ligand formed between the complexing agent and cupric ion—i.e., whether the ligand is monodentate, bidentate, tridentate, or the like.

Ammonium ion is not required for the etchants of this invention to operate, though it is desirable to add an ammonium salt as it acts as an exaltant for the etching rate. Typical ammonium salts suitable for purposes of this invention include ammonium carbonate, ammonium sulphate, ammonium chloride and the like. The amount of ammonium salt is not critical and may vary broadly from no addition to less than that amount which causes appreciable fuming during the etching operation. The preferred range varies between 0.5 mole per liter of solution to 5 moles per liter and more preferably, from about 1 to 2 moles per liter of solution. It should be noted above, however, that where an ammonium salt is used, even if some ammonia is lost during continuous etching, ammonia replenishment may not be required because an equilibrium appears to exist where further ammonia is not lost and additional ammonia need not be added.

The chloride or bromide ion may be added to the etchant solution either in the form of cupric or ammonium chloride or bromide or in any other convenient form as would be obvious to the art such as sodium chloride or bromide. The function of the halide ion is not fully understood, but is believed to increase the etching rate, possibly by acting as a solubilizer for cuprous copper formed on the surface of a copper part being etched. The chloride or bromide ion may be present in minor amount, the actual concentration not being critical. Preferably, it is present in solution in an amount of at least 0.1 mole per liter of solution and more preferably, in an amount of from 0.2 to 2.5 moles per liter. It appears that there is a synergism between the ammonium and halide resulting in substantially increased etching rates.

The nitrate ion is added to the etchant solution to prevent the formation of "cuprous sludge" on the copper surface that might otherwise tend to retard the etching operation. Though not wishing to be bound by theory, it is believed that this film is of cuprous copper and the nitrate ion acts as a solubilizer therefore. In addition, it is believed that the nitrate ion provides the secondary function of assisting in the oxidation of the cuprous copper to the divalent cupric form. The source of the nitrate ion is not critical. Compounds such as ammonium nitrate, nitric acid and alkali and alkaline earth metal nitrates such as sodium or potassium nitrate being suitable. Small amounts of nitrate ions provide some benefit and greater amounts provide greater benefit until a maximum is reached beyond which no further improvement is realized. In general, a preferred range for the nitrate ion is from about 0.1 to 2.5 moles per liter of solution and preferably from about 1 to 1.5 moles per liter of solution.

As indicated above, the etchants of the invention may be used over a wide range of pH, preferably from about 4 to 13. However, in the most preferred embodiment of the invention, the etchants are used within the relatively neutral pH range of from about 6.0 to 8.0 and most preferably from about 7.0 to 7.8 because of the greater variety of available complexing agents, the lack of attack on substrate materials, photomasks, photoresists, ease of handling, safety and the like. It is believed that operating at a neutral pH is unique in itself as neutral etchants have not heretofore been available in the marketplace.

The operating temperature for the etchant solution is not critical. Satisfactory results are obtained from below normal ambient room temperature to the boiling point of the etchant though it is generally desirable to maintain the temperature somewhat above room temperature, preferably between about 100 and 160° F. At higher temperatures, a faster etching rate is possible, thus increasing the number of available complexing agents useful for purposes of the invention. The limitation on temperatures appears to be the equipment used for etching, the etchants attacking many commercial pieces of equipment at the higher temperatures.

The etchants of this invention are capable of continuous use. Moreover, they do not require regeneration or substantial replenishment since active ingredients are not consumed or lost and divalent copper is continuously supplied by oxidation of etched monovalent copper and maintained in substantially constant amount in solution by the complexing agent. Where ammonia is used as an exaltant, some ammonia may be lost initially, but an equilibrium seems to establish itself where no further ammonia is lost and no additional ammonia is needed. Therefore, replenishment with an ammonium salt is not required. The volume of the etchant is maintained constant by addition of water.

To maintain the etching operation continuous, it is necessary to remove precipitated copper values either continuously or periodically during use of the etchant to prevent saturation thereof. This can be readily accomplished by circulating a portion of the etchant to filtering means, centrifugation means or by any other manner known to those skilled in the art. In this respect, the copper values recovered are in a form believed to be a hydroxide which form has significant commercial value. For example, the precipitate can be used to prepare a fresh etchant solution.

Examples are given below for purposes of illustration wherein etching is conducted in a stagnant solution. Only a few of the possible modifications are specifically mentioned and it is not the purpose of these examples to limit the scope of the invention. Agitation of the solution will, of course, accelerate the rates of reaction mentioned. In this respect, spray etching is much preferred to etching in a stagnant solution as the etch rate will be from 5 to 30 times faster. In all cases, aeration of some sort is necessary to convert cuprous to cupric.

| Example Number | 1 | 2 | 3 | 4 | 5 | 6 | 7 | 8 | 9 | 10 |
|---|---|---|---|---|---|---|---|---|---|---|
| Ingredient (gm./l.): | | | | | | | | | | |
| Cupric chloride dihydrate | 50 | 50 | 50 | 50 | | 50 | 50 | 50 | | 50 |
| Cupric nitrate | | | | | 50 | | | | 50 | |
| Monoethanolamine | 200 | 200 | 200 | 200 | 200 | | | | | |
| Tartaric acid | | | | | | 200 | 200 | 200 | 200 | |
| Glycollic acid | | | | | | | | | | 200 |
| Ammonium nitrate | | | 100 | 100 | | | | 100 | 100 | 50 |
| Ammonium chloride | 50 | 50 | 50 | 50 | | 50 | 50 | 50 | 50 | 50 |
| Initial pH [1] | 7.5 | 7.5 | 7.5 | 9.0 | 7.5 | 7.5 | 7.5 | 6.5 | 9.3 | 7.5 |
| Yield [2] | 5 | 6 | 7 | 6 | 5 | 6 | 5 | 4 | 7 | 4 |
| pH at yield | 7.3 | 7.9 | 6.8 | 7.1 | 7.0 | 7.2 | 7.1 | 6.7 | 7.1 | 6.6 |
| pH adjustment [1] | 7.5 | 7.5 | 7.5 | 9.0 | 7.5 | 7.6 | 7.5 | 6.4 | 9.0 | 7.8 |
| Yield [2] | 1 | 4 | 5 | 6 | 4 | 4 | 3 | 5 | 7 | 6 |
| pH at yield | | | 6.9 | 7.5 | 7.2 | | | 6.6 | 7.5 | 7.1 |
| pH adjustment [1] | | | 7.5 | 9.0 | 7.5 | | | 6.5 | 9.1 | 7.5 |
| Yield [2] | | | 4 | 5 | 4 | | | 6 | 3 | 5 |
| pH at yield | | | 7.1 | 7.4 | 7.3 | | | 6.6 | 7.2 | 7.2 |
| Temperature, °F | 125 | 125 | 125 | 125 | 125 | 125 | 125 | 125 | 125 | 125 |

[1] Initial pH and also subsequent pH adjusted with either HCl or NH₄OH to value indicated.
[2] Yield is the number of ounces of copper etched per gallon of etchant at the point where heavy precipitate inhibits etching. At yield, etching is stopped, precipitate removed, pH adjusted and etching continued. For the test, 2" x 2" copper foil was used in liter of etchant.

In the above table, a heavy brown film formed on the copper etched using the etchants of Examples 1, 2, 6 and 7. Upon appearance of the film, etching slowed and finally stopped. Etching could not again be initiated even with removal of the precipitate from the solution. In contrast, no brown film formed on the copper etched in the remaining examples. Upon formation of a heavy precipitate, etching rate slowed. However, when the precipitate was removed by filtration and pH adjusted, the etchants continued to etch at approximately their original rate.

| | Example 11 | Example 12 |
|---|---|---|
| Cupric chloride dehydrate, gms | 40 | 40 |
| Monoethanolamine, gms | 120 | 150 |
| Ammonium nitrate, gms | 100 | |
| Sodium nitrate, gms | | 75 |
| Ammonium chloride, gms | 70 | |
| Sodium chloride, gms | | 75 |
| Water | (1) | (1) |
| pH | 7.8 | 7.5 |
| Temperature, °F | 125 | 125 |

[1] To one liter.

The above formulations were used in a spray etching operation as opposed to stagnant solutions as in Examples 1-10. Consequently, due to the aeration as a result of spray etching, etch rate was enhanced. For the solution of Example 11, etching continued until about 23 ounces of copper per gallon of etchant were dissolved. At the end of the 23 ounces of copper etched, etching slowed due to the formation of a precipitate. The precipitate was removed by filtration and the operation repeated. About 22 ounces of copper per gallon could be etched in about the same period of time. With respect to the formulation of Example 12, etching continued for about 25 minutes during which time, about 9 ounces per gallon of solution was etched. Precipitate was filtered from solution and the etching cycle repeated. Both the formulations of Examples 11 and 12 can be continuously treated.

Soluble molybdenum, tungsten or vanadium salts may be added to the etching solution to prevent attack on solder mask as described in the above noted copending application Ser. No. 58,200. When added, it may be added to the solution of the form of a water-soluble organic or inorganic salt such as an alkali or alkaline earth metal salt, in the form of an ammonium molybdate or the like, or in any other form known to the art. The preferred forms include ammonium molybdate, molybdenum trioxide, sodium tungstate, sodium vanadate, and vanadium pentaoxide. The amount of molybdenum, tungsten or vanadium added to the etchant is not critical, small amounts providing some benefit while larger amounts provide greater benefit until a maximum is reached beyond which no further improvement is realized. In general, the amount of molybdenum or vanadium expressed as a metal may vary between 0.005 and 0.20 moles per liter of etchant solution.

We claim:

1. In an aqueous etching solution for copper comprising a source of cupric ions as an oxidant for copper, at least one non-fuming complexing agent for said cupric ions, said complexing agent being capable of forming a solution soluble copper (II) complex at solution pH and being capable of sufficient dissociation in solution under operating conditions to permit etching of copper at a rate of at least 0.1 mil per minute, and a member selected from the group of chloride ions and bromide ions, which etching solution has a pH varying between about 4 and 13, the improvement comprising the addition of nitrate ions in an amount sufficient to prevent build-up of a film on the surface of the copper being etched.

2. The etching solution of claim 1, ammonium ions in solution in an amount sufficient to act as an exaltant for the etchant rate.

3. The etching solution of claim 2 where the nitrate io is present in an amount of from 0.1 to 2.5 moles per liter of solution.

4. The etching solution of claim 2 where the nitrate ion is present in an amount of from 1 to 1.5 moles per liter of solution.

5. The etching solution of claim 2 where the cupric ions are present in an amount of from 0.1 to 1.2 moles initially per liter of solution.

6. The etching solution of claim 1 where the complexing agent is present in an amount at least sufficient to complex with all of said cupric ions.

7. The etching solution of claim 1 where the chloride or bromide ion is present in an amount of from 0.5 to 2.5 moles per liter of solution.

8. The etching solution of claim 2 where the ammonium ions are present in an amount of from 0.5 to 5.0 moles per liter of solution.

9. The etching solution of claim 2 where the ammonium ions are present in an amount of from 1 to 2 moles per liter of solution.

10. The etching solution of claim 2 where the complexing agent is selected from the group of alkylene amines, alkanolamines, hydroxycarboxylic acids, aminocarboxylic acids, polyalcohols, polyamines, heteroaliphatic dicarboxylic acids, amino acids and pyrophosphates.

11. The etching solution of claim 10 where the complexing agent is alkanolamine.

12. The etching solution of claim 10 where the log of the stability constant ($K_1$) at the copper (II) complex does not exceed about 12 at 25° C.

13. The etching solution of claim 2 where the pH of the solution varies initially between 6 and 8.

14. The etching solution of claim 2 where the pH of the solution varies initially between 7.0 and 7.8.

15. The etching solution of claim 2 also containing a member selected from the group of molybdenum ions, tungsten ions and vanadium ions in an amount sufficient to prevent attack on solder.

16. In an etching solution for copper comprising a source of cupric ions as a primary oxidant for copper in an amount of from 0.1 to 1.2 moles per liter of solution, a substantially non-fuming complexing agent for said cupric ions, said complexing agent being capable of forming a solution soluble copper (II) complex at solution pH and being capable sufficient dissociation in solution under operating conditions to permit etching of copper at a rate of at least 0.1 mil per minute, a member selected from the group of chloride and bromide ions in an amount of from 0.5 to 2.5 moles per liter of solution, and ammonium ions as an exaltant in an amount of from 0.5 to 5.0 moles per liter of solution, said solution having a pH varying between about 4 and 13, the improvement comprising the addition of nitrate ions in an amount sufficient to prevent build-up of a film on the surface of the copper being etched.

17. The etching solution of claim 16 where the nitrate ion is present in an amount of from 0.1 to 2.5 moles per liter of solution.

18. The etching solution of claim 16 having a pH varying between about 6 to 8.

19. The etching solution of claim 16 having a pH varying between about 7.0 and 7.8.

20. The etching solution of claim 16 where the complexing agent is selected from the group of alkylene amines, alkanolamines, hydroxycarboxylic acids, aminocarboxylic acids, polyalcohols, polyamines, heteroaliphatic dicarboxylic acids, amino acids and pyrophosphate.

21. The etching solution of claim 16 where the log of the stability constant ($K_1$) of the copper (II) complex does not exceed about 12 at 25° C.

22. The etching solution of claim 16 also containing a member selected from the group of molybdenum, tungsten, and vanadium ions in an amount sufficient to prevent attack on solder.

References Cited

UNITED STATES PATENTS

| | | | |
|---|---|---|---|
| 2,887,373 | 5/1959 | Winkler et al. | 156—18 X |
| 2,908,557 | 10/1959 | Black et al. | 252—79.2 X |
| 2,942,954 | 6/1960 | Thomas | 156—18 |
| 3,361,674 | 1/1968 | Miller et al. | 252—79.1 |
| 3,466,208 | 9/1969 | Slominski | 156—18 |
| 3,507,795 | 4/1970 | Gardner | 134—41 X |

WILLIAM A. POWELL, Primary Examiner

U.S. Cl. X.R.

156—18; 252—79.4